(12) United States Patent
Keller et al.

(10) Patent No.: US 7,396,021 B2
(45) Date of Patent: Jul. 8, 2008

(54) SEALING DEVICE FOR ROLL BEARINGS WITH COMPENSATION FOR RAD

(75) Inventors: Karl Keller, Hilchenbach (DE); Konrad Roeingh, Hilchenbach (DE)

(73) Assignee: SMS Demag Aktiengesellschaft, Dusseldorf (DE)

( * ) Notice: Subject to any disclaimer, the term of this patent is extended or adjusted under 35 U.S.C. 154(b) by 0 days.

(21) Appl. No.: 11/418,344

(22) Filed: May 4, 2006

(65) Prior Publication Data

US 2006/0202429 A1 Sep. 14, 2006

Related U.S. Application Data

(62) Division of application No. 10/471,648, filed as application No. PCT/EP02/02119 on Feb. 28, 2002, now abandoned.

(30) Foreign Application Priority Data

Mar. 21, 2001 (DE) ................................. 101 13 869

(51) Int. Cl.
*F16J 15/32* (2006.01)
*B21B 31/07* (2006.01)
*F16C 33/10* (2006.01)

(52) U.S. Cl. ........................ 277/551; 277/572; 277/562; 72/247; 384/485

(58) Field of Classification Search ................. 277/549, 277/551, 562, 572–573; 384/485–486; 72/247, 72/236–237
See application file for complete search history.

(56) References Cited

U.S. PATENT DOCUMENTS

| 2,050,137 | A | * | 8/1936 | Walsh | 285/331 |
|---|---|---|---|---|---|
| 2,181,203 | A | * | 11/1939 | Reynolds | 277/504 |
| 2,955,857 | A | * | 10/1960 | Smith | 277/611 |
| 3,383,883 | A | * | 5/1968 | Dutaret | 464/20 |
| 3,980,309 | A | * | 9/1976 | Dechavanne | 277/550 |
| 4,289,321 | A | * | 9/1981 | Cather, Jr. | 277/552 |
| 4,898,479 | A | * | 2/1990 | Simmons | 384/130 |
| 5,145,219 | A | * | 9/1992 | Babuder | 285/330 |
| 6,623,047 | B2 | * | 9/2003 | Olechnowicz et al. | 285/328 |

* cited by examiner

*Primary Examiner*—Vishal Patel
(74) *Attorney, Agent, or Firm*—Andrew Wilford

(57) ABSTRACT

A roll stub is rotatable relative to a stationary support and has a rotatable support fixed to the roll stub, an annular and radially directed seal surface fixed on one of the supports, and a seal ring on the other of the supports having a lip engageable with the seal surface. A support element that is substantially less stiff than the seal ring is provided between the other support and the seal ring for biasing the lip against the seal surface while permitting of the seal ring relative to the other support. A clamp body rotationally fixed to the other support directly engages the seal ring and presses the seal ring directly against an abutment. Interengaging tooth formations on the clamp body and on the seal ring arrest the seal ring on the other support against angular movement thereon while permitting relative radial movement.

7 Claims, 3 Drawing Sheets

SEALING DEVICE FOR ROLL BEARINGS WITH COMPENSATION FOR RAD

CROSS REFERENCE TO RELATED APPLICATIONS

This application is a division of U.S. patent application Ser. No. 10/471,648 filed 10 Sep. 2003 now abandoned as the US national phase of PCT application PCT/EP02/02119, filed 28 Feb. 2002, published 3 October 2002 as WO 02/076645, and claiming the priority of German patent application 10113869.5 itself filed 21 Mar. 2001.

FIELD OF THE INVENTION

The invention relates to a seal assembly for sealing the roll side of a roll bearing wherein at least one elastic seal element on the roll stub rides on an annular seal surface, the seal element and seal surface being mounted on respective supports one of which is stationary and the other of which is movable with the roll stub.

BACKGROUND OF THE INVENTION

Such seal assemblies have long been used in oil-film bearings. As a rule expensive seal elements are used which on the one hand prevent oil from getting from the oil-film bearing to the roll body and on the other hand prevent particle-carrying coolant and lubricant from getting from the roll body into the oil-film bearing.

As a result of the various loads encountered during rolling, the roll stub can get radially offset in its mount. In unloaded nonworking rolls the seal space between the roll-stub sleeve and the bearing sleeve is less in a lower region, whereas the gap is greater in the opposite upper region. If the roll is working and pressure is being exerted from the mount through the bearing to the roll, the bearing gap between the roll-stub sleeve and the bearing sleeve is greater in the lower region whereas in the opposite upper region it decreases. This radial offset created by different loads must be compensated out by the seal elements.

As a result when the roll is not under load the seal lips in the lower region of the seal element are pushed together, while the seal lips in the upper region barely touch the seal surface. When the roll is working the seal lips are on the contrary pushed together a great deal in the upper region of the seal element and in the lower region barely touch the seal surface.

This radial play therefore creates a considerable load and as a result wear of the seal on the one hand from being squeezed together and on the other hand from the constant load change and furthermore the danger that the sealing effectiveness is not optimal with respect to the seal surface engaged by the seal lips.

OBJECT OF THE INVENTION

It is an object of the invention to provide such a seal assembly that in spite of radial offset of the roll-stub sleeve in the bearing sleeve the seal lips of the seal element always optimally engage the seal surface without over stressing the seal elements and while reducing wear of the seal elements and increasing their service lives.

SUMMARY OF THE INVENTION

The invention attains this object in that the seal element and/or the seal surface are supported by at least one elastic support element on the holder, the elastic support element being less stiff than the seal lips of the seal element. In this system, when there is a radial offset, the seal lip of the seal element is not changed in shape in a smaller seal gap, but as a result of its greater stiffness the forces are applied to the elastic support element carrying the seal element, which is compressed in this region of the seal gap. On the opposite side, the elastic support element can expand in the larger seal gap so that here also the seal lip sits without substantial movement in an optimal manner on the seal surface.

It has been found advantageous when the stiffness of the elastic support element and/or the extent of radial compensation movement of the elastic support element are presettable. In this manner on the one hand seal elements of different stiffness can be accommodated while on the other hand the elastic support element changes shape to accommodate the expected radial offset.

It is preferable when the seal element and/or the seal surface is retained in its holder between at least one clamp body and if necessary an abutment, the clamping permitting a radial movement of the seal elements and/or of the seal surface, angular movement of the seal element being prevented. In this manner, for example a stationary seal element is not entrained by friction with the seal surface while being able to follow radial movement.

The elastic support element can be an O-ring or closed-end tube that e.g. is filled with an elastomer so as to ensure an optimal equalization of radial offset.

It is simpler to make and replace the seal element and the elastic support element when the elastic support element is integrated in the seal element, forming with it one part or piece.

It is preferable when the clamp body and if necessary the extension and/or the surface of the seal element and/or the seal surface that engage the abutment and if necessary the abutment are coated with Teflon. This makes possible radial movement of the seal element or of the seal surface in its holder.

To prevent the seal element and/or the seal surface from moving angularly in addition to radially, it is recommended that at least the clamp body and the surface of the seal element and/or the seal surface that engages the clamp body, have a radially extending toothing or guides that engage each other without substantial friction.

BRIEF DESCRIPTION OF THE DRAWING

The invention is described more closely with reference to a drawing. Therein.

SPECIFIC DESCRIPTION

Figure 1:
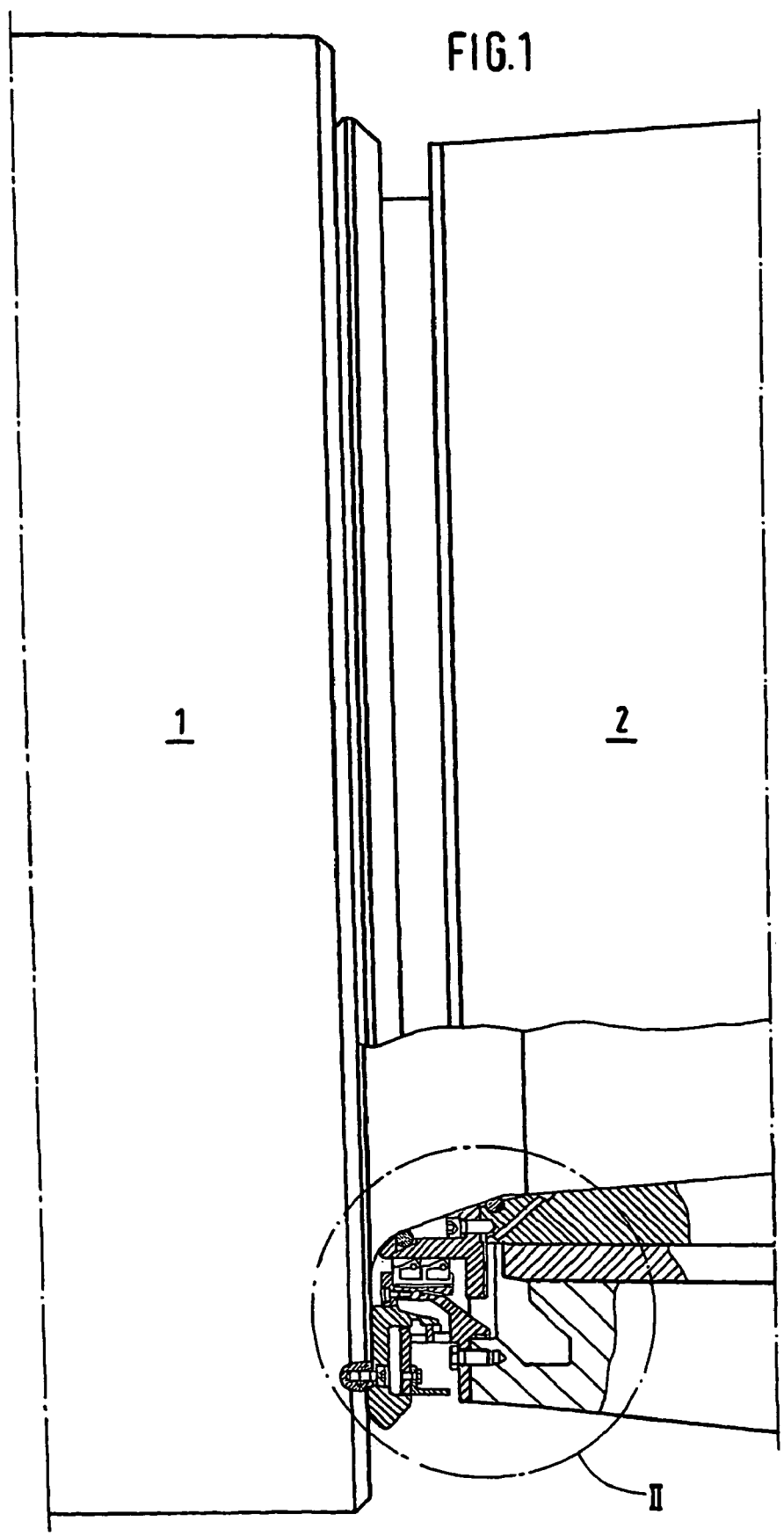
FIG. 1 is a view of a roll with an oil-film bearing.
Figure 2:
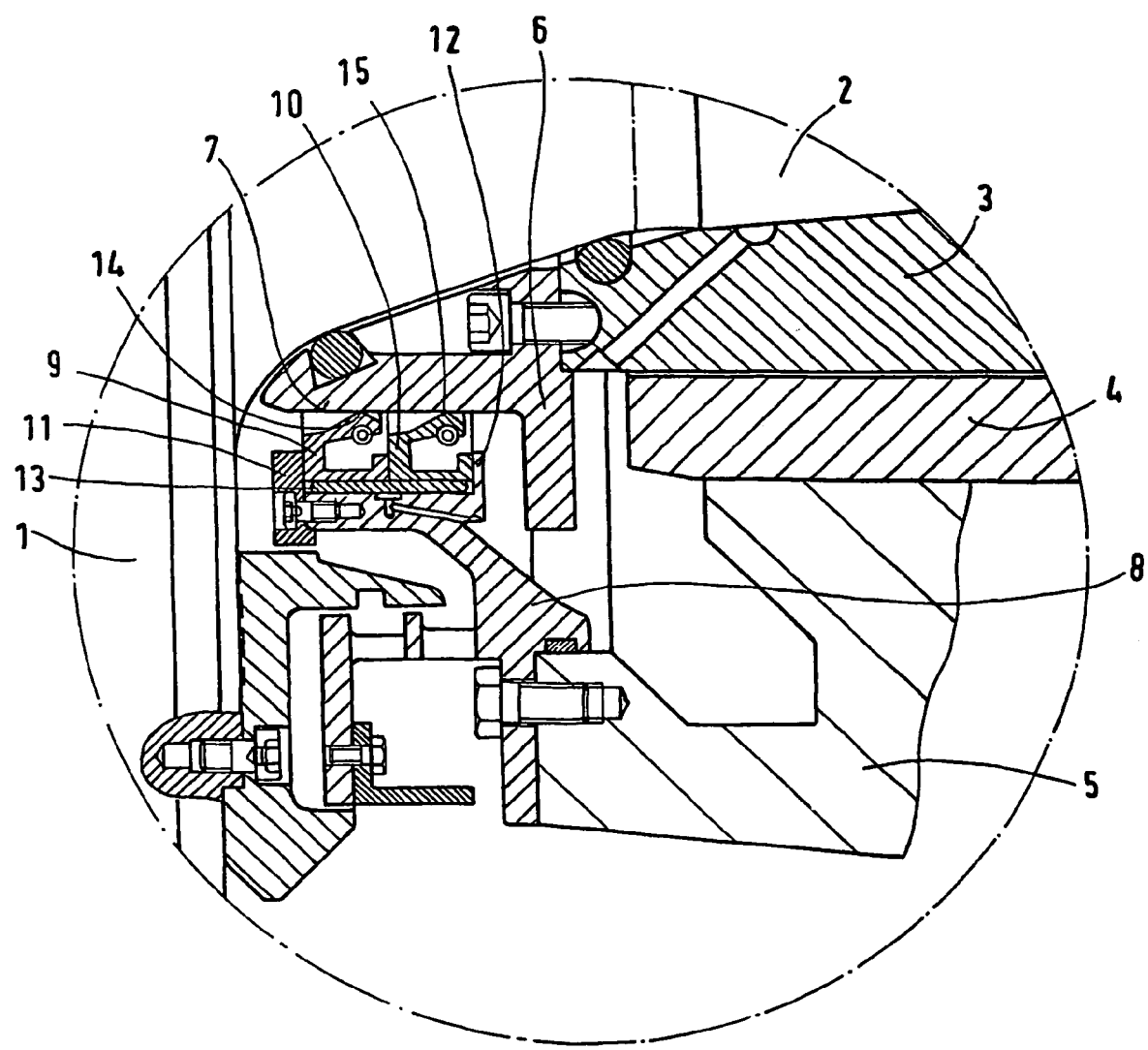
FIG. 2 is a detail of the seal.

FIG. 1 shows a roll 1 having a roll stub 2. The roll stub 2 is supported as shown in FIG. 2 by a roll-stub sleeve 3 in a bearing sleeve 4 in turn carried by amount 5. The roll-stub sleeve 3 carries a roll-stub sleeve extension 6 having a seal surface 7. The mount 5 carries a holder 8 that in turn carries seal elements 9 and 10. The seal elements 9 and 10 themselves are pressed by a clamping body 11 against an abutment 12 such that the seal elements 9 and 10 can move radially but not angularly in the holder 8. Between the holder 8 and the seal elements 9 and 10 is an elastic support element 13. The elastic support element 13 is formed as a closed tube filled with an elastomer.

If there is any radial offset between the roll stub 2 and the roll-stub sleeve 3 on one side and the bearing sleeve 4 and the mount 5 on the other, the seal elements 9 and 10 compensate out this radial offset. Since the elastic element 13 is not as stiff as the lips 14 and 15 of the seal elements 9 and 10, the elastic support element 13 can take up the radial offset without substantial bending of the seal lips 14 and 15. This ensures that the seal lips 14 and 15 are always seated on the seal surface 7 for optimal sealing. In addition with this positioning of the lips 14 and 15 there is minimal wear.

The illustrated embodiment shows only that the seal elements 9 and 10 are supported by the elastic support element 13. It is also within the scope of the invention that such an elastic support element be provided between the seal surface 7 and the roll-stub extension 6, or that both the seal element and the seal surface are supported by respective elastic support elements.

Figure 3:
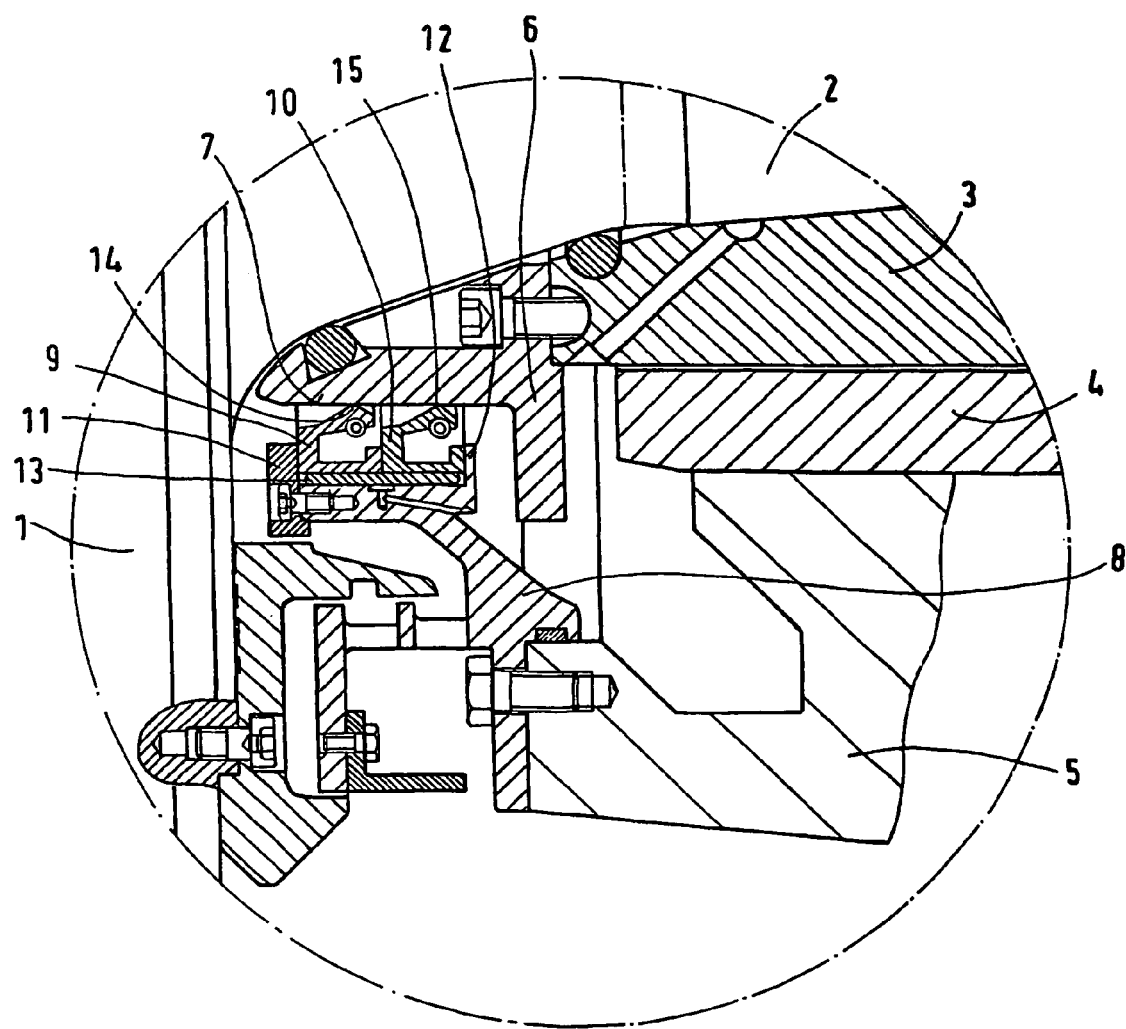
FIG. 3 is a view like FIG. 2 of an alternative arrangement according to the invention.

FIG. 3 shows an arrangement where the elastic support element is a closed tube 13'. In addition FIG. 3 shows at 16 how the clamp ring 11 and seal ring 9 can have axially interengaging teeth that rotationally couple these parts to each other.

We claim:

1. In a roll assembly where a roll stub rotates about an axis relative to a stationary support, a seal assembly comprising:
   a rotatable support fixed to the roll stub;
   an annular and radially directed seal surface fixed on one of the supports;
   a seal ring on the other of the supports having a lip engageable radially with the seal surface;
   means including at least one radially compressible support element that is substantially less stiff than the seal ring between the other support and the seal ring for biasing the lip radially against the seal surface while permitting radial shifting of the seal ring relative to the other support;
   an abutment fixed on the other support; and
   means including
      a clamp body rotationally fixed to the other support, directly axially engaging the seal ring, and pressing the seal ring axially directly against the abutment and axially interengaging tooth formations on the clamp body and on the seal ring
   for arresting the seal ring on the other support against angular movement thereon while permitting relative radial movement.

2. The seal assembly defined in claim 1 wherein the support element is a closed tube.

3. The seal assembly defined in claim 1 wherein the support element is unitarily formed with the seal ring.

4. The seal assembly defined in claim 1 wherein the seal ring, clamp body, and abutment have mutually engaging surfaces, the lip having a surface engageable with the seal surface, at least one of the surfaces being coated with polytetrafluoroethylene.

5. The seal assembly defined in claim 1 wherein the seal ring is a C-section gland seal.

6. The seal assembly defined in claim 1 wherein there are two such seal rings engaging the surface and held by the clamp body on the other support.

7. The seal assembly defined in claim 1 wherein the other support is the stationary support.

* * * * *